Aug. 11, 1936.  H. P. HOLLER  2,050,570
AIRCRAFT
Filed May 14, 1934  2 Sheets-Sheet 1

INVENTOR
H. P. Holler
BY
E. J. Fetherstonhaugh
ATTORNEY

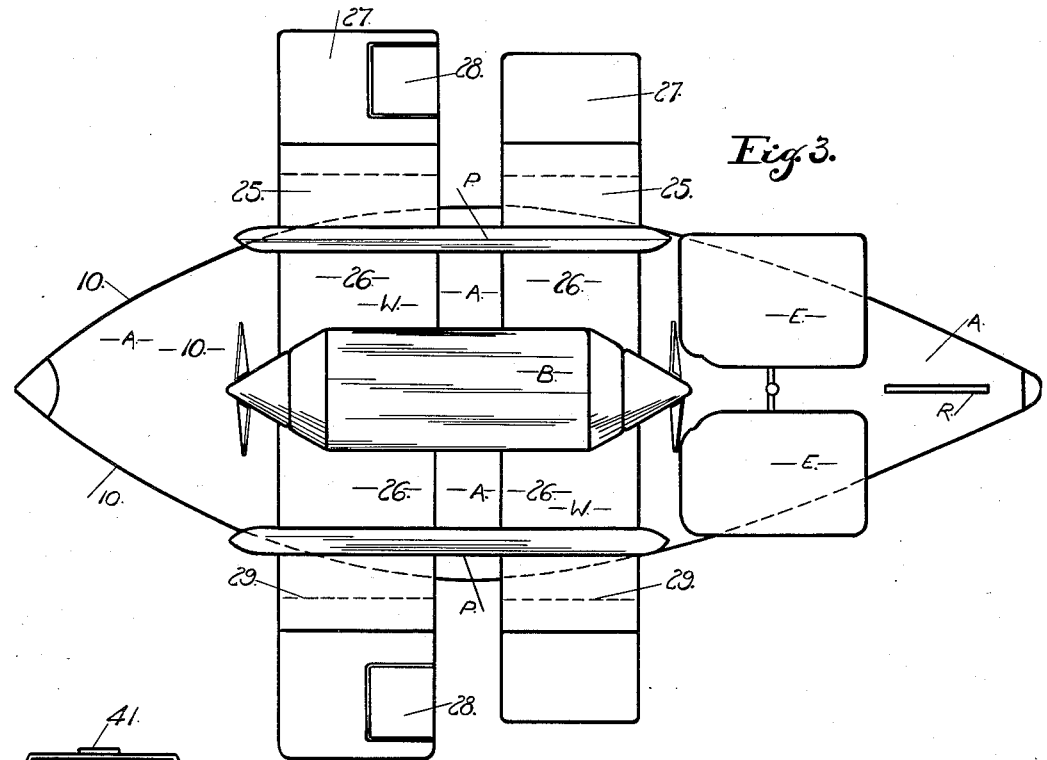
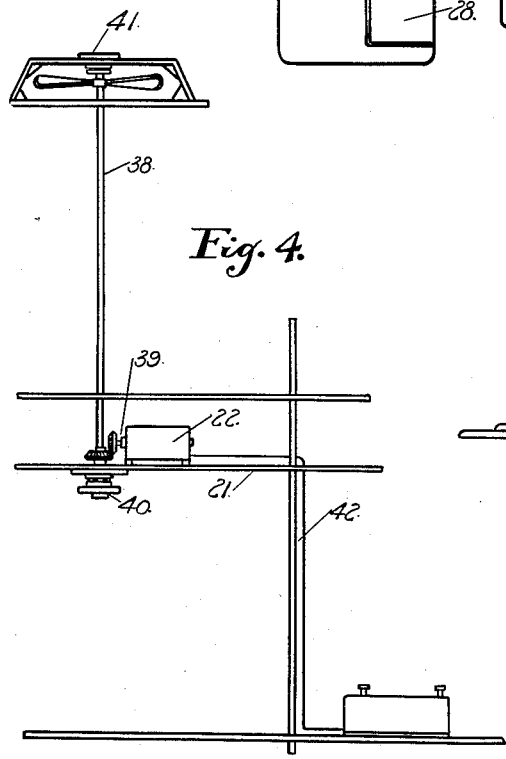
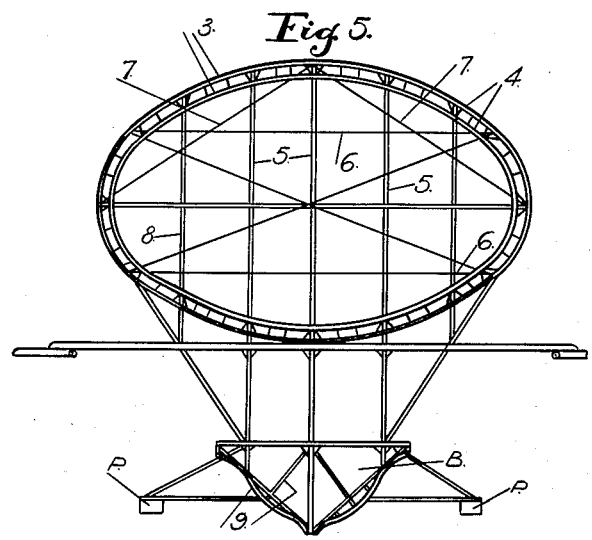

Patented Aug. 11, 1936

2,050,570

UNITED STATES PATENT OFFICE 2,050,570

AIRCRAFT

Helmuth Peter Holler, Poplars, Md.

Application May 14, 1934, Serial No. 725,425

4 Claims. (Cl. 244—5)

The invention relates to an aircraft, as described in the present specification and illustrated in the accompanying drawings which form a part of the same.

The invention consists essentially of the novel features of construction pointed out broadly and specifically in the claims for novelty following a description in detail of an acceptable form of the invention.

The objects of the invention are to devise a rigidly constructed aircraft rendered buoyant and capable of ascending by the employment of a gas bag or bags held in the form of a dirigible aerostat or balloon of a special, comparatively small, dimension and peculiar, preferably ellipsoid, form in combination with and assisted by specially devised horizontal propellers on top of the balloon, and by air pressure lifting the craft, as usually, through propulsion of vertical propellers from the fuselage or cabin boat here rigidly attached to the balloon; to furnish a type of craft mainly for air navigation of an unusually great safety and of unusually great carrying power, fit for extended voyages through the air and over long stretches of water; to construct an aircraft that will easily ascend from a comparatively small field or body of water, and safe and that can slowly descend to land or water; to equip the aircraft with specially devised elevators in addition to tandem planes, for the purpose of an increase of plane surface, besides the main purpose of regulation of elevation; to increase the safety of travel, both through the air and on the water, by furnishing a laterally expanded balloon, a specially designed broadened boat, and specially designed outrigger pontoons; to balance the weight of the aircraft throughout and evenly on the center as much as possible, by placing motors on both ends of the cabin boat, and by additional means of arrangement, also by placing fuel tanks and ballast around the center of the cabin boat, so as to obviate nose dives and tail spins more than ever; to save hangar space when such craft is at port rest, by folding the end parts of the wing planes downwardly; another object is accomplished by specially devised railings at the sides of the bottoms of both the balloon and the cabin, to enable navigators to make observations and repairs, without endangering their lives; to furnish a rigid construction of both main types of aerostat and airplane into a single unit, the aerostat being of a comparatively small size, preferably only about thrice the dimensions or bulk of the cabin boat and landing gear combined, and by attaching the rudder underneath the balloon, towards the rear of the same, instead of to the cabin boat; to further increase in safety in aeronautics by providing a division of the balloon into vertical compartments containing ballonets hermetically closed to each other, and each of the latter to be separately filled from a feeding pipe running underneath, all the length from the first to the last ballonet; and generally to provide an aircraft that will have all the principles for safe, yet comparatively speedy travel of this type of aircraft, and the various sizes and purposes thereof, from the small elegant and comfortable pleasure yacht to the large and equally convenient airship for regular passenger service, or the type for carrying freight of heavy weight, without encountering the common dangers and discomforts of cramped quarters, cold, etc. of the small monoplane or biplane, etc., and the unwieldiness in ascent and landing, as well as the very much larger surface object to air-resistance, of the large dirigibles heretofore built and used.

In the drawings, Figure 1 is a side view of the aircraft.

Figure 3 is a plan outline view of the aircraft, though not invariable as seen from underneath.

Figure 4 is an enlarged detail showing an acceptable arrangement for driving the horizontal propellers.

Figure 5 is a front view of the aircraft showing the frame construction of a transverse section of the aerostat, plane, and cabin boat, as co-ordinated and combined for an approximate equalization as regards equilibrium, into a single unit.

Like numerals of reference indicate corresponding parts in the various figures.

Figures 1, 2:
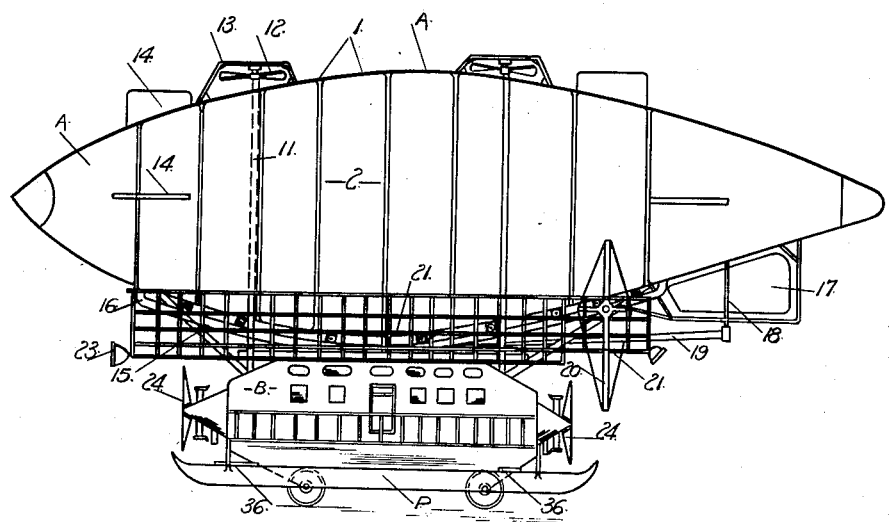
Figure 2 is a front view of the aircraft.

Beginning the detailed description with that of the construction, it is readily seen from the drawings that the invention is neither that of a diminutive dirigible only, nor of a mere loose combination of such a small dirigible with an airplane and a cabin boat, but that the whole device forms a single unit of proper rigid construction throughout.

It is seen from Figure 5 that the preferably ellipsoid aerostat (A) is built of transverse annular walls, placed at desired intervals throughout the length of the craft 1, forming compartments 2 of said aerostat, the rims being formed by two preferably elliptic rings 3, one smaller and placed inside the other, and combined with the larger one by short peripheral, radial and diagonal rim braces 4, the latter extending fanlike outwardly from the ends of the main frame held by upright posts 5. Of the latter main posts there are four or more transverse sets, each consisting of two or more of said posts, Figure 5 showing three of such posts standing in a transverse position across the craft. The transverse section frames of the aerostat are bolted to the aforementioned main posts by main horizontal stanchions 6 and diagonal braces 7. A similar construction, as far as it is necessary and convenient, may with advantage be adopted also in the construction of the cabin boat (B) varying in suitable configuration according to various types of this aircraft. In the section wall-frames of the aerostat are added two or more shorter upright supports 8, which as shown, need not reach to the cabin boat.

The bracing of the hull of the boat 9 also contributes towards perfect rigidity, as shown. Special mention may be made of the staunch beams of the aerostat 10, either outwardly attached to the cross section walls of said aerostat, or in between them, and thus in line with the outer rims, but running in an opposite direction, i. e., not transversely, but longitudinally, all the length of the aerostat, at the top, bottom, and the sides, preferably with diagonal rafter braces, (not shown), all bent and joined at both ends, to hold said aerostat longitudinally also in a perfectly rigid position and securing to it full strength. The cabin and boat may be of any suitable configuration and construction, preferably that shown in the drawings, namely slanting toward the ends, to allow free air passage when the craft is in flight.

As is seen from a comparison of Figure 1 with Figure 2, the general contour of the aerostat is that of a flattened, cigar-shaped, dirigible bulging at the sides, the advantages of which in diminishing air pressure, as well as increasing buoyancy, are obvious. As already indicated, the aerostat is divided into a number of compartments whose walls are formed of the annular sections, also already described. Inside each of the respective sections are placed collapsible, roughly wheel-shaped, ballonets, although they might be globular, in which latter case the widths of the compartments should be equal to the respective heights. Increase in the number of the ballonets, within certain weight limits, increases safety, as the damage to one or several of said ballonets will not deflate the remaining ones.

In the center of two or more—more than two, if more than two horizontal propellers are wanted—of the upright aerostat section frames (the third ones in the design, reckoning from each end of the aerostat, though not necessarily so), and affixed to the center posts of said sections frames, are placed upright pipes (Figure 1, No. 11), inside of which are located freely-moving driving rods for the two or more horizontal, preferably four-blade, lifting propellers which butt at the top against brackets 13 fastened to the top beam of said aerostat.

Two or more vertical and two or more horizontal fins immovably attached to the outside of the aerostat, preferably toward the ends 14, hold said aerostat in a stable position during locomotion. If preferred, both kinds of fins may extend farther in length or width than shown, and the increase in number or extension in size of fins, while more stabilizing in effect, somewhat diminishes the speed.

Underneath the aerostat, slightly toward one or the other side, i. e., right or left side of the aerostat, whichever be preferred, though, to indicate this choice, two pipe-ends are shown in Figure 2, runs a gas-feeding pipe 15 with extension members 16 toward each of the compartments, and more particularly, connected with each of the ballonets to be filled, each particular member thus connected being provided with a suitable valve and device to gauge the pressure of the gas fed through it.

At the stern of the aerostat, and underneath it, is placed the rudder 17 centrally or not pivoting, or if preferred, turning hingewise, on a rod 10 in a bracket attached to said aerostat, as shown, and this rudder, is steered from the cabin.

Forwardly of the rudder are found revolvable elevators 20 one on each side, both turning on the same rod extended and which may be held in the center by the bottom beam of the aerostat frame or, by the frame of the bridge, said elevators controlling increase and decrease of elevation of the craft when in motion, by air pressure, and, after the desired altitude has been reached, said elevators may be turned into a position parallel with the wing planes, to add to the carrying capacity of the supporting planes; and, when the craft is riding the water, they still may be utilized as sails, they then being turned into a vertical position.

Underneath and around the aerostat runs the narrow platform of the main bridge, with railings 21, to serve for observations, examinations, and repairs. This bridge aids in the general rigidity of the craft and adds also somewhat to the carrying support in flight.

If the horizontal lifting propellers are to be driven by electricity, the actuating motors, under protecting cowls, may be placed on this bridge, or are placed elsewhere, head- and tail-lights may be affixed to the ends of the bridge, as indicated in the drawings, Figure 1, No. 23.

The closed cabin boat (B) which may be heated from the exhaust pipes, by electricity, or otherwise, contains power-generating devices, such as gasoline engines, or any other suitable engines, usually called motors, with their propellers 24 at each end. In larger types of this aircraft, additional motors and propellers may be provided at the sides of the cabin or on the bridge, but each propeller should be driven independently of the other or others, which is especially important in this invention because, while one or more motors may stall, this craft may still be held near its course, on account of its great buoyancy, till adjustments and even repairs can be made. If desired, speed may be controlled by using modern adjustable propellers.

The cabin boat contains also divisional pilot's or mechanic's cabins, preferably one for each motor, and all the remaining space of the cabin may be used for the accommodation of passengers or the storage of freight, etc. The placing of the windows and doors in the cabin varies according to the size and purpose of the particular type of this craft.

The two airfoils or wing planes (Figure 3, No. 25) placed tandemwise one behind the other and on the same line with each other, consist each of a long central part 26, rigidly connected with the roof of the cabin and with the whole frame of the craft. To the two ends of each of them are joined shorter revolvable end-wings 27, the two of the front plane having ailerons, preferably cut in 28, hinged to said end-wings, and the whole end-wings also being hinged to the long main planes, underneath, as shown at 29, a little back from the ends of the main planes.

The rear plane, according to the rear airfoil carrying capacity desired, may be somewhat smaller, as indicated in the drawings, or it may be in size exactly like the front plane. If smaller, it insures a slightly upturned position for the bow of the craft.

The planes, as designed, are of the usual construction, frame of longitudinal and transverse ribs, with covering spanned around it. They are preferably slightly bent down at the rear, and they may taper toward the ends, if desired, as well as slightly bend downward at the ends. The drawings show them of even thickness, and perfectly straight, to submit that, in this invention, it is of little importance to create air-trapping pockets by such wing-tips turned down for slower descent and to avoid sideways skidding, since the unusual arrangement of the whole craft provides plenty of plane surface acting as a parachute for the whole aircraft in descent; yet, such slight bendings of the ends of the end-wings, as preferred by some builders, are also in the invention advantageous rather than otherwise. If desired, the wing-planes may be wider, and may even join so as to form together one large wing on each side of the cabin, thus increasing the carrying power.

The landing gear consists of cushioned wheels 32 on axles 33 running through the keel of the boat, and they have shock absorbers of some kind, either of a spring or some other device 34.

The outrigger pontoons 35 extend far outside the boat and are connected with said boat by braces or rods 36, some of which (not shown) may be bent under and run across the keel. These pontoons, preferably of light metal, are strongly constructed, watertight, and they may be connected with each other in front and rear of the boat by boards, both to secure their position and to increase the effect of pressure on the water 36.

If desired, the distance of the pontoons from the boat may be increased, and thus still greater stability in sailing on the water be achieved, yet, ordinarily, the proportionate distance shown in the drawings will be preferred. If desired, and as is shown, the pontoons may be held also by rods or cables attached to the aerostat 37 which however, increases the parasitic resistance somewhat, of course.

Figure 4 explains itself. The driving rod or shaft of the horizontal propeller, one for each such propeller, is turned by the motor shaft by means of beveled gears, as shown 39, the motor preferably being placed on the bridge. The driving shaft, preferably loosely clamped to a main post of the frame of the craft, or the pipe in which moves the driving shaft firmly clamped to said post, extends downward through the floor and at its lower end, closely underneath the floor beam, a larger smooth-rimmed wheel welded to the end of said shaft revolves underneath ball bearings placed on top of said wheel and between it and a metal disc 40, which latter arrangement is for holding the shaft and propeller down, and thus lifting the craft up, when in motion or forceful action.

The latter purpose is partly accomplished also by the bracket over the propeller, which is also fitted with ball-bearings 41, wires for transmission of the electric current 42 run from the storage battery or generator below to each of the motors above, for driving the horizontal propellers, controlled by suitable switches.

What I claim is:

1. In aircrafts, a cabin plane having a keel, upright posts rigid with the keel and the side walls of the cabin and extending upwardly therebeyond, and an elliptical shaped aerostat having outer and inner elliptic rims secured together by rim braces and rigidly secured from within and without to said upright posts, and transverse section frames situated within the aerostat supported by said upright posts and the inner rims and forming compartments.

2. In aircrafts, a cabin plane having a keel, a pair of wings in tandem formation and in alignment with one another and extending on either side of said plane and secured thereto, upright posts rigidly secured to the keel and the side walls of the cabin and extending upwardly therebeyond, and an elliptical shaped aerostat having outer and inner elliptic rims secured together by rim braces and rigidly secured from within and without to said upright posts, and transverse section frames situated within the aerostat supported by said upright posts and the inner rims and forming compartments.

3. In aircrafts, a plane having a keel, a pair of wings in tandem formation situated on said plane secured thereto and extending on either side thereof, outrigger frames extending on either side of said plane and having pontoons secured thereto, said outrigger frames being supported from the side structure of said plane to the underside of said wings, upright posts rigidly secured to the keel and the side walls of the plane and extending upwardly therebeyond, an elliptical shaped aerostat situated at the said wings and having outer and inner elliptic rims secured together by rim braces and rigidly secured from within and without to said upright posts, transverse section frames situated within the aerostat supported by said upright posts and the inner rims and forming compartments.

4. In aircraft, a cabin plane having a keel, a pair of main wings placed tandemwise one behind the other and on the same line with each other, and each having a long central portion rigidly connected to the top of the cabin and with the whole frame of said plane, revolvable end wings secured to the ends of said main wings, upright posts rigidly secured to the keel of the cabin and side walls thereof and extending upwardly therebeyond adjacent to the ends of the cabin and intermediate thereof, and an elliptical shaped aerostat having outer and inner elliptic rims secured together by rim braces and rigidly secured from within and without to said upright posts, and transverse section frames situated within the aerostat supported by said upright posts and the inner rims forming compartments.

HELMUTH PETER HOLLER.